(12) United States Patent
Goegler et al.

(10) Patent No.: US 11,630,295 B2
(45) Date of Patent: Apr. 18, 2023

(54) ILLUMINATION MODULE FOR MICROSCOPE APPARATUS, CORRESPONDING CONTROL METHOD AND MICROSCOPE APPARATUS

(71) Applicant: CARL ZEISS MICROSCOPY GMBH, Jena (DE)

(72) Inventors: Michael Goegler, Wolfratshausen (DE); Jochen Ingo Schweizer, Fuerstenfeldbruck (DE); Lei Cai, Shanghai (CN); Genxin Dou, Shanghai (CN); Changqing Liu, Shanghai (CN)

(73) Assignee: CARL ZEISS MICROSCOPY GMBH, Jena (DE)

( * ) Notice: Subject to any disclaimer, the term of this patent is extended or adjusted under 35 U.S.C. 154(b) by 407 days.

(21) Appl. No.: 16/738,813

(22) Filed: Jan. 9, 2020

(65) Prior Publication Data
US 2020/0218051 A1 Jul. 9, 2020

(30) Foreign Application Priority Data
Jan. 9, 2019 (CN) .......................... 201910019538.X

(51) Int. Cl.
*G02B 21/06* (2006.01)
*G02B 21/16* (2006.01)
*H05B 45/10* (2020.01)

(52) U.S. Cl.
CPC ............. *G02B 21/06* (2013.01); *G02B 21/16* (2013.01); *H05B 45/10* (2020.01)

(58) Field of Classification Search
CPC ........ G02B 21/06; G02B 21/16; G02B 21/32; H05B 45/10
See application file for complete search history.

(56) References Cited

U.S. PATENT DOCUMENTS

2005/0152028 A1 7/2005 Mitzkus
2009/0224694 A1 9/2009 Höring et al.
(Continued)

FOREIGN PATENT DOCUMENTS

CN 2630877 Y 8/2004
CN 101943794 A 1/2011
(Continued)

OTHER PUBLICATIONS

First Office Action and Search received for Chinese Patent Application No. 201910019538.X, dated Jul. 21, 2021, 21 pages.
(Continued)

*Primary Examiner* — Minh D A
(74) *Attorney, Agent, or Firm* — Shook, Hardy & Bacon L.L.P.

(57) ABSTRACT

The present invention relates to an illumination module for a microscope apparatus, comprising a plurality of monochromatic sources and a control device, wherein the control device is configured to control states of the plurality of the monochromatic sources, and the control device includes a selecting and switching module which realizes a switch among the plurality of monochromatic sources in response to an operation of the user. The design of the illumination module makes the microscope apparatus compact in structure, highly reliable, convenient in use, and extremely enhancing the work efficiency of the user. The present invention also relates to a method for controlling the illumination module, and a microscope apparatus comprising the illumination module.

32 Claims, 2 Drawing Sheets

(56) References Cited

U.S. PATENT DOCUMENTS

| | | |
|---|---|---|
| 2012/0081532 A1 | 4/2012 | Kumai |
| 2014/0368903 A1* | 12/2014 | Tanner .................. G02B 21/24 |
| | | 33/263 |
| 2016/0061717 A1 | 3/2016 | Bawolek |
| 2018/0128681 A1* | 5/2018 | Otsuka ................. A61B 5/0075 |
| 2018/0338079 A1* | 11/2018 | Suzuki ..................... G06T 5/50 |

FOREIGN PATENT DOCUMENTS

| | | |
|---|---|---|
| CN | 102448225 A | 5/2012 |
| CN | 102466875 A | 5/2012 |
| CN | 102768401 A | 11/2012 |
| CN | 204462528 U | 7/2015 |
| CN | 104965301 A | 10/2015 |
| CN | 105486667 A | 4/2016 |
| CN | 107505697 A | 12/2017 |
| CN | 108445616 A | 8/2018 |
| CN | 108535854 A | 9/2018 |
| DE | 10106275 A1 | 4/2002 |
| DE | 20304412 U1 | 6/2003 |
| DE | 20319495 U1 | 3/2004 |
| DE | 102007007797 A1 | 8/2008 |
| EP | 1424579 A1 | 6/2004 |
| WO | 2018056959 A1 | 3/2018 |

OTHER PUBLICATIONS

Second Office Action received for Chinese Patent Application No. 201910019538.X, dated Nov. 24, 2021, 17 pages.
Supplemental Search Report received for Chinese Patent Application No. 201910019538.X, dated Mar. 21, 2022, 1 page.

* cited by examiner

ILLUMINATION MODULE FOR MICROSCOPE APPARATUS, CORRESPONDING CONTROL METHOD AND MICROSCOPE APPARATUS

CROSS REFERENCE TO RELATED APPLICATION

The present application claims priority to Chinese Patent Application No. CN201910019538.X, filed on Jan. 9, 2019, and the entire contents thereof is incorporated herein by reference.

TECHNICAL FIELD

The present invention relates to a microscope apparatus, in particular a fluorescence microscope apparatus for e.g. medical or biological uses. Specifically, the present invention relates to an illumination module for microscope apparatus, a method for controlling the illumination module, and a microscope apparatus including the illumination module.

BACKGROUND ART

Microscope, as an instrument for magnifying a micro object or a part of the object to facilitate observation by an user, has been widely used in a variety of fields. In particular, it is known to use a fluorescence microscope to observe activities of molecules or cells in the medical or life science field. Fluorescence microscope is a microscope using fluorescent light to generate images, where the sample to be observed is irradiated by a light with a specific wavelength or wave band. This light is absorbed by fluorescent pigments in the sample, emitting a light with a longer wave length which is referred to herein as "Fluorescent light". By means of a filter, the emitted fluorescent light is separated from the much stronger illumination light and forms an image in the microscope. For this purpose, such a microscope needs a plurality of light sources, in particular LEDs, to achieve illumination. According to different objects to be observed or changes of observation needs, the plurality of LEDs are required to be lighted up together in some time, and to be lighted up solely or partially in some time.

For a microscope apparatus, especially a fluorescence microscope, containing a plurality of LEDs, it is conventionally known to arrange a plurality of controllers, which are separated from each other, to respectively control individual LED. These controllers are normally independent upon the microscope body, and include cables such as data cables, power cables, and the like for connecting with outer operating or controlling means, such as PC. This design trends to make an enormous size of the whole microscope apparatus and relative higher cost. Moreover, the excess of cables could easily render failures, making the maintenance and utilization inconvenient.

SUMMARY OF THE INVENTION

The present invention is aimed to solve the above problems in the prior art by proposing a novel microscope apparatus and a method of using and controlling the same.

On the one hand, the present invention provides an illumination module for a microscope apparatus, comprising a plurality of monochromatic sources, for example LEDs (Light Emitting Diodes), and a control device, wherein the illumination module is wholly built in the microscope apparatus, and the control device is configured to control states of all the monochromatic sources, said control device includes a selecting and switching module which is used to switch among the plurality of monochromatic sources in response to an operation of the user. The microscope apparatus is in particular a fluorescence microscope which may be used in the fields of medicine, biology, chemistry, mineralogy, gemology, and so on.

The technical term "built in" here refers to that the control device, especially a main function part, for example a printed circuit board carrying electronic components, of the control device is wholly disposed or integrated within the microscope apparatus, for example disposed within the microscope body or housing, such that there is no spacing or exposed connection cables between the control device and the microscope body or housing.

The present invention integrates the function control of a plurality of LEDs on one control device (in particular a printed circuit board) and place the LEDs as well as the control device thereof within the microscope body or housing, such that the overall dimension of the microscope apparatus is reduced on one hand, and the control, e.g. turn-on/turn-off or switch-over, brightness adjustment or the like, of the plurality of LEDs becomes more convenient and reliable on the other hand.

The illumination module of the present invention constructs a color encode illumination module, which provides the microscope apparatus with advantages of a compact structure, a convenience in use or operation, a high reliability, and a low cost.

The illumination module of the present invention includes the following advantageous technical features that can be applied solely or in any technically possible combinations:

- the selecting and switching module is configured to select one or more, or all of the plurality of monochromatic sources, to form a predetermined combination/combinations;
- the selecting and switching module is configured to set sequence for a plurality of the predetermined combinations, and achieve a switch and/or cycle according to the sequence in response to the operation of the user;
- the control device includes a main function part for changing states of the monochromatic sources, and a single operating element which is operatively connected to the main function part and which is accessible to the user;
- the control device includes a brightness adjustment module which is configured to vary the brightness value of each individual monochromatic source;
- the control device includes a memory module which is configured to store the brightness value of individual monochromatic source and which can impart the stored brightness value to corresponding monochromatic source;
- the memory module is configured to memorize the brightness value of a monochromatic source just when the latter is turned off, and to impart the stored value to the monochromatic source when the latter is lighted up again;
- the control device includes a comparison module configured to compare the brightness value of the individual monochromatic source with a given threshold, and refuse to turn on the monochromatic source when the brightness value of the monochromatic source memorized by the memory module is lower than the threshold;
- the operating element is configured in the form of a button, which, when being pressed, can achieve a switch among different monochromatic sources and/or different predetermined combinations of the monochromatic sources;

the operating element is added with a function of knob on the basis of a button, the button and the knob being integrated on a single operating element, and the knob being arranged to regulate the brightness of the monochromatic source;

the button is arranged to change the state of one or more monochromatic sources each time when it is pressed;

the knob is arranged to be rotated in two different speeds, so as to adjust the brightness value of related monochromatic source with two different speeds;

the button and/or knob is provided with depressions on the end surface to accommodate fingers of the user;

the button and/or knob is positioned close to an adjustment wheel of the microscopic observation system of the microscope apparatus;

the monochromatic source is in the form of LED; the LED includes four LEDs configured to emit light with different wave lengths;

in the four LEDs, a first LED is configured to emit a light with a wave length of 470 nm, a second LED is configured to emit a light with a wave length of 365 nm or 380 nm, a third LED is configured to emit a light with a wave length of 625 nm, and a fourth LED is configured to emit a light with a wave length of 505 nm or 565 nm;

the monochromatic source is in the form of a laser, a xenon lamp with a filter, or a white light source with a filter; a plurality of light source indicators are further provided, which are respectively associated with the plurality of monochromatic sources for indicating the state of corresponding monochromatic source;

the plurality of light source indicators are configured to respectively emit a light with a different color; and the plurality of light source indicators are each configured to illuminate in two different manners, especially an always-on manner and a flashing or blanking manner.

Owing to the present invention, the user is allowed to, at the time of observing the sample on the microscope apparatus, switch among different LEDs or channels at the level of the body or housing of the microscope, so as to adapt for different sample statuses or observation needs, which extremely enhances the working efficiency of the user.

On the other hand, the present invention provides a method for controlling an illumination module of a microscope apparatus, the illumination module comprising a plurality of monochromatic sources and a control device, and the control device controls states of the plurality of monochromatic sources, and includes a selecting and switching module which is used to switch among the plurality of monochromatic sources in response to an operation of the user. According to present invention, the illumination module is wholly built in the microscope apparatus to allow the user to manipulate a state variation of individual monochromatic source at the level of the microscope while performing an observation with the microscope.

The control method according to the present invention includes the following advantageous features:

one or more, or all of the plurality of monochromatic sources are selected by means of the selecting and switching module to form a predetermined combination/combinations;

the predetermined combination(s) is(are) set in a sequence and switched and/or circulated according to the sequence by means of the selecting and switching module in response to the operation of the user;

the control device comprises a single operating element in the form of a button, the control method including pressing the button to switch among different monochromatic sources and/or predetermined combinations of the different monochromatic sources;

the operating element is added with a function of knob on the basis of the button, the button and the knob being integrated on one and the same operating element, and the knob being rotated to adjust the brightness of each monochromatic sources;

the control method includes rotating the knob to adjust the brightness value of individual monochromatic source, in particular the brightness value of the monochromatic source that is currently turned on;

the control method includes rotating the knob in a first speed to progressively adjust the brightness value of the related monochromatic source;

the control method includes rotating the knob in a second speed to let the brightness value of the related monochromatic source rapidly reach a maximum value or a minimum value;

the control method includes storing the brightness value of each individual monochromatic source just when the latter is turned off, and imparting the stored brightness value to corresponding individual monochromatic source when the latter is turned on;

the control method includes comparing the brightness value of individual monochromatic source with a given threshold when the individual monochromatic source is to be turned on, and refusing to turn on the monochromatic source when the brightness value is lower than the threshold; and the control method includes showing which monochromatic source is currently turned on by means of light source indicators with lights of different colors, and representing the brightness value of the related monochromatic source by means of a light in different states.

Furthermore, the present invention provides a microscope apparatus, the microscope apparatus including the aforementioned illumination module and/or an illumination module that can be operated or used by the aforementioned method.

Particularly, the microscope apparatus is a fluorescence microscope apparatus.

BRIEF DESCRIPTION OF THE DRAWINGS

The preferred examples of the present invention will be described in detail in the following with reference to the figures, in which.

DETAILED DESCRIPTION OF THE EMBODIMENTS

Figure 1:
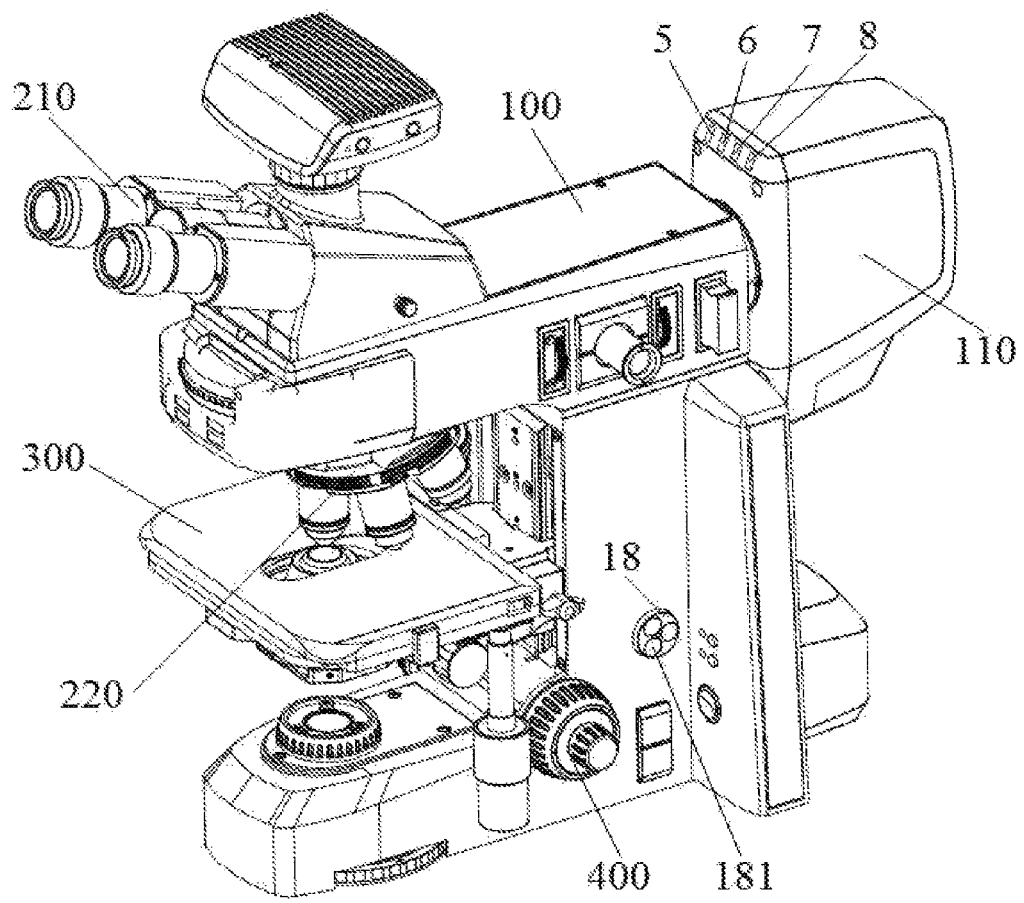
FIG. 1 is a perspective view of a microscope apparatus according to a preferred embodiment of the present invention.

Referring to FIG. 1, the microscope apparatus may include a frame 100 and a microscopic observation system mounted on the frame. The microscopic observation system may include ocular lens 210, objective lens 220, an object table 300 positioned below the objective lens 220 for carrying a sample to be observed, and an illumination module 110 for illuminating the sample to be observed on the object table. Specifically, the illumination module 110 may be a color encoding illumination module.

According to the present invention, the illumination module may include a plurality of monochromatic sources, especially LEDs. These LEDs and the control device thereof are built in the frame 100 of the microscope apparatus. The illumination module 110 may be packaged into a housing of the microscope apparatus and arranged adjacent the microscopic observation system on the top of the frame 100. It may also be connected to the microscope externally.

Figure 2:
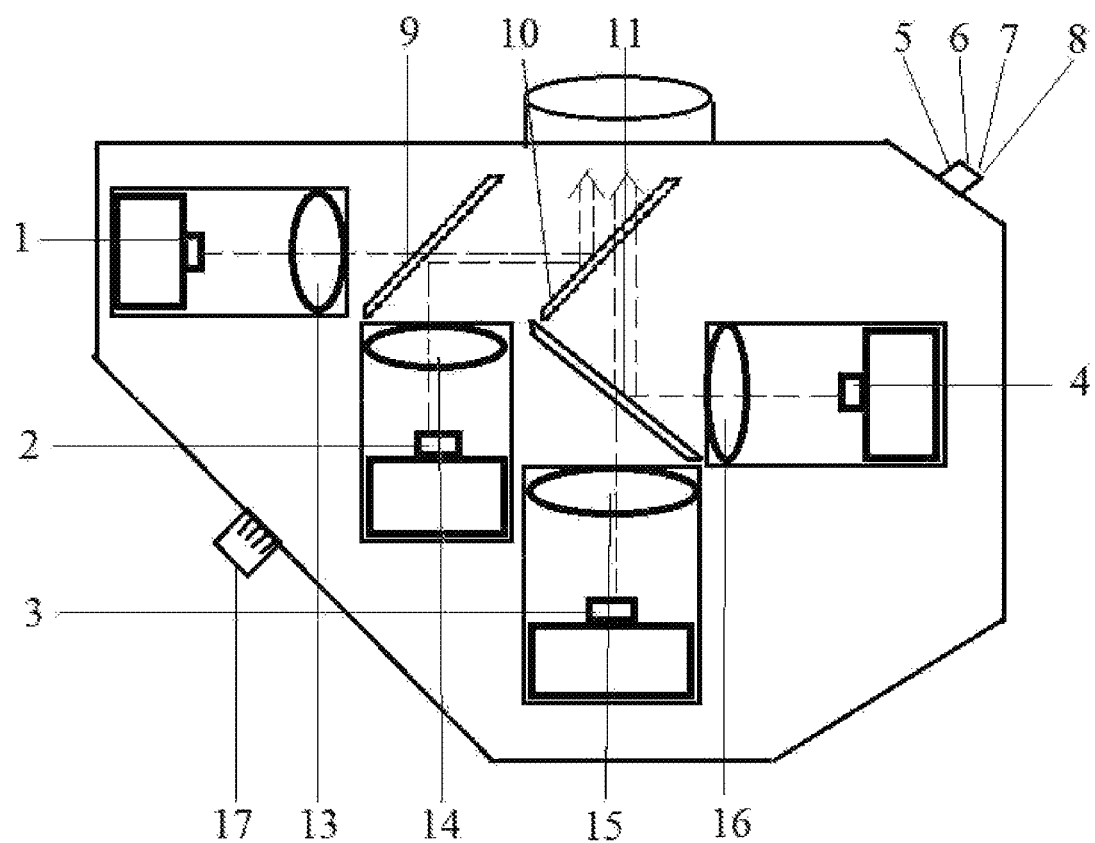
FIG. 2 is an arrangement diagram of the LEDs according to the preferred embodiment of the present invention.

Now referring to FIG. 2, according to the preferred embodiment illustrated in this figure, the illumination module includes four LEDs 1, 2, 3, and 4 as LED lights. Certainly, the number of the LEDs is not limited thereto, and there may be more or less LEDs. According to the present invention, these LEDs are independent from each other, and can be switched in a specific sequence and/or cycle. The technical term "switch" means to successively turn on (i.e., light up) one LED or more LEDs, and, while turning on individual LED, turn off (i.e. black out) or not turn off the LED(s) that have been turned on previously.

A first LED 1 is configured to emit a light with e.g. a wave length of 470 nm. As illustrated by dotted lines in FIG. 2, the light emitted by the first LED 1, after being treated by a beam expand and collimation lens 13 facing the first LED 1, reaches a color separation filter 10 through a color separation filter 9, and then is deflected and exits from the illumination module 110 at the color separation filter 10.

A second LED 2 is configured to emit a light with e.g. a wave length of 365 nm or 380 nm. As illustrated by dotted lines in FIG. 2, the light emitted by the second LED 2, after being treated by a beam expand and collimation lens 14 facing the second LED 2, is deflected by the color separation filter 9 towards the color separation filter 10, and then is deflected and exits from the illumination module 110 at the color separation filter 10.

A third LED 3 is configured to emit a light with e.g. a wave length of 625 nm. As illustrated by dotted lines in FIG. 2, the light emitted by the third LED 3, after being treated by a beam expand and collimation lens 15 facing the third LED 3, reaches the color separation filter 10 through a color separation filter 11, and then exists from the illumination module 110 through the color separation filter 10.

A fourth LED 4 is configured to emit a light with e.g. a wave length of 505 nm or 565 nm. As illustrated by dotted lines in FIG. 2, the light emitted by the fourth LED 4, after being treated by a beam expand and collimation lens 16 facing the fourth LED 4, reaches the color separation filter 11, and then exits from the illumination module 110 through the color separation filter 10.

As to the above examples, the color separation filter 9 may be configured in such a way that a light with a wave length of 470 nm can be transmitted, and a light with a wave length of 365 nm or 380 nm can be deflected, especially be reflected at an angle of 90°. The color separation filter 10 may be configured in such a way that a light with a wave length of 505 nm or 565 nm as well as a light with a wave length of 625 nm can be transmitted, and the light with the wave length of 470 nm and the light with the wave length of 365 nm or 380 nm can be defected. The color separation filter 11 may be configured in such a way that the light with the wave length of 625 nm can be transmitted, and the light with the wave length of 505 nm or 565 nm can be deflected.

According to the present invention, the plurality of LEDs are controlled by one and the same control device. For this purpose, the control device may include a main function part for controlling states of each individual LED, in particular changing the states thereof. The main function part may be formed by a printed circuit board carrying electronic components, the printed circuit board being connected to the first to fourth LEDs 1-4 via cables of an interface 17 and being powered by a built-in power source.

Further, the printed circuit board may be provided with an expansion interface to update or extend its function modules.

Returning to FIG. 1, the control device may further include a knob 18 operatively connected to the main function part. The knob 18 is arranged in such a way that it is accessible to and can be operated by the user, specifically, it can be pressed and rotated by the user to respectively switch among different LEDs and adjust the light intensity or brightness value of the individual LED.

For this purpose, the main function part of the control device may comprise a brightness adjusting module for adjusting brightness value of each individual LED.

Preferably, as illustrated by FIG. 1, depressions 181, for example three substantially circular depressions 181 shown in said figure, are disposed on an end surface of the knob 18 to accommodate fingers of the user so as to facilitate the operation of rotating the knob.

Still referring to FIG. 1, it is further preferred that the knob 18 is arranged close to an adjustment wheel 400 of the microscopic observation system of the microscope apparatus, and the adjustment wheel 400 may be, for example, an adjustment hand wheel for regulating the object table 300. In this way, the user is allowed to easily control each individual LED when he is observing a sample by the microscopic observation system, without needing significant movement of his hand.

A method for using or controlling the microscope apparatus of the present invention will be described in the following in combination with the examples shown in the figures. However, it should be understood that the method of the present invention is not limited to the illustrated and described examples.

The method of the present invention is mainly in controlling the states, in particular on and off states, of selected or predetermined combinations or groups of LEDs by means of the control device built in or integrated into the microscope apparatus, so as to facilitate the observation of a sample for example marked by a plurality of fluorescent dyes. According to the method, the user of the microscope apparatus is allowed to switch or adjust the LEDs while observing the sample, without interrupting the observation for replacement of LEDs, which extremely enhances the operation convenience and work efficiency of the user.

Specifically, the method includes a step of selecting, by means of a selecting and switching module of the control device, "at least a part of the LEDs" from all of the LEDs to form a predetermined combination of LEDs, said selection of "at least a part of the LEDs" comprises selecting one LED and selecting plural LEDs. The method further includes a step of arranging the plurality of predetermined combinations in a certain sequence, and switching among the LEDs in the plurality of predetermined combinations according the sequence. The selecting and switching module may consist of such as a logical control component, a memory circuit, a switch circuit, and the like on the printed circuit board. The switching is in particular performed in a predetermined sequence and/or cycle, in order to generate various images that can be observed or captured by e.g. a camera, according to different marks, for instance fluorescent marks.

Taking the microscope apparatus shown in FIG. 2 for example, the user may select all of the four LEDs 1, 2, 3, 4; set their switching sequence by the aid of the main function part, i.e. relevant components and circuits on the printed circuit board, of the control device; and turn on and/or turn off individual LEDs in a given sequence or cycle via a press action on the operating element of the control device, i.e. the knob 18. In this case, provision can be made that one LED is switched at each time when the knob 18 is pressed.

For instance, a first press on the knob 18 may cause the second LED 2 to be turned on, such that the light with a wave length of 365 nm or 380 nm is irradiated onto the sample to be observed. A second press on the knob 18 may cause the first LED 1 to be turned on while the second LED 2, which has been turned on, is turned off, such that the light with a wave length of 470 nm is irradiated onto the sample to be observed. A third press on the knob 18 may cause the fourth LED 4 to be turned on while the first LED 1, which has been turned on, is turned off, such that the light with a wave length of 505 nm or 565 nm is irradiated onto the sample to be observed. A fourth press on the knob 18 may cause the third LED 3 to be turned on while the fourth LED 4, which has been turned on, is turned off, such that the light with a wave length of 625 nm is irradiated onto the sample to be observed. A fifth press on the knob 18 may cause the first to fourth LEDs 1, 2, 3, 4 all to be turned on. Afterwards, a sixth press on the knob 18 may cause the second LED 2 to be turned on alone, or cause all of the LEDs to be turned off, thus a next cycle can be performed.

As an alternative embodiment, the user may select to use part of the LEDs. For example, the user may select only the first and third LEDs 1 and 3 on the operation panel of the control device (for example, a touchable liquid crystal screen accompanying the microscope, an external computer, an operation interface of a smart camera, and the like). In this case, the use or control method may be set by means of the selecting and switching module of the control device in such a way that when the knob 18 is pressed at the first time, the first LED 1 is turned on; when the knob 18 is pressed at the second time, the third LED 3 is turned on while the first LED 1 is turned off; when the knob 18 is pressed at the third time, both of the first LED 1 and the third LED 3 are turned on; when the knob 18 is pressed at the fourth time, both of the first and third LEDs 1, 3 are turned off and thereby being ready for the next cycle, or only the first LED 1 is in the turned-on state and thereby repeating the above cycle.

According to a preferable embodiment of the present invention, the brightness of each individual LEDs 1, 2, 3, 4 are adjustable. Specifically, the adjustment of brightness is directed to a specific LED, in particular the one currently turned on, and can be achieved by rotating the knob 18.

As an alternative embodiment, the camera of the microscope may automatically regulate the exposure parameters and take photographs, when one or more LEDs are lighted up by pressing the knob 18.

Preferably, the microscope apparatus of the present invention may be provided with a plurality of indicators, such as LED indicators in the form of LED lights. As illustrated by the reference numbers 5, 6, 7, and 8 in FIG. 1 and FIG. 2, these LED indicators may be arranged to be visible from outside of the microscope apparatus and be associated with one of the LEDs 1, 2, 3, and 4 in each case, so as to indicate current state of the respective LED.

In this way, for example, when the first LED 1 is turned on, an indicator 5 associated therewith is also lighted up; and when the first LED 1 is turned off, the LED indicator 5 is also blacked out, such that current turned on and/or turned off state of the first LED 1 is shown to the user.

It is particularly preferable to select the LED indicator 5, 6, 7 and 8 in such a way that they generate lights of different colors, so as to make it easier for the user to identify the LED that is currently turned on.

In this case, the LED indicators 5, 6, 7 and 8 may be designed to change the light-up way, for example from always-on to flashing/blinking, when the brightness value of the respective LED 1, 2, 3, 4 approaches or reaches the maximum value, in order to call attention of the user to a brightness status of the LED.

More preferably, the knob 18 may be arranged to be rotated at two obviously different speeds, so as to respectively adjust a brightness value of the related LED by two different modes. In particular, the two speeds of rotation are a first speed called as "low speed" and a second speed called as "high speed". The two adjustment modes are a progressive adjustment and a rapid adjustment.

The brightness value of the corresponding LED may change progressively, when the knob 18 is rotated at the low speed, such as less than 4 turns per second. For instance, once the knob 18 is rotated over an angle, for example corresponding to an impulse, in the clockwise direction, the brightness value of the corresponding LED is increased by a quantity (one increment); and once the knob 18 is rotated over an angle in the anticlockwise direction, the brightness value of the corresponding LED is decreased by a quantity (one decrement). The quantity may for instance have a range of 0-1024, wherein 0 represents the minimum brightness value of the LED (at this point, the LED is for example in a black-out or non-illuminated state), and 1024 represents the maximum brightness value of the LED.

The brightness value of the corresponding LED may rapidly reach the minimum value or the maximum value, when the knob 18 is rotated at the high speed, such as more than 4 turns per second. For example, the brightness value of the corresponding LED may reach the maximum value, when the knob 18 is rapidly rotated no more than two turns in the clockwise direction. The brightness value of the corresponding LED may reach the minimum value, when the knob 18 is rapidly rotated no more than two turns in the anticlockwise direction.

In a preferable embodiment of the present invention, the control device comprises a memory module, which may for example consist of a memory component and related circuits arranged on the printed circuit board. The memory module may be configured to store or memorize the brightness value of each individual LED just when it is turned off, that is, when the knob 18 is pressed, and impart the stored brightness value as a default value to corresponding LED when it is turned on again.

In this case, the method of the present invention may include the following step: each of the LEDs 1, 2, 3, 4 is turned on with the memorized brightness value when they are switched by pressing the knob 18. The memorized brightness value is the brightness value of the LED immediately before it is turned off.

Further, the control device of the microscope apparatus in the present invention preferably includes a comparison module, which may for example include components arranged on the printed circuit board, such as an operational unit, a comparator, and the like, as well as the related circuits, and which may be associated with the memory module. The comparison module may be configured to compare the brightness value of each individual LED with a given threshold when the LED is turned on, and refuse to turn on or light up the LED when the brightness value is lower than the threshold.

In this case, the method of the present invention may include a step of not turning on or not lighting up the LED, when a given value or a default of the brightness of one or more LEDs is lower than the given threshold. For example, when four LEDs 1, 2, 3, 4 are selected as described above, but the brightness value of the LEDs 1, 3 are lower than respective given thresholds, then LED 2 is turned on when the knob 18 is pressed at the first time, and LED 4 is turned on when the knob 18 is pressed at the second time, and LEDs 2, 4 are both turned on when the knob 18 is pressed at the third time.

As an alternative embodiment, LED may be replaced with a laser, a xenon lamp with a filter, or a white light source with a filter.

What is claimed is:

1. An illumination module for a microscope apparatus, comprising:
a plurality of monochromatic sources and a control device, wherein the control device is configured to control states of the plurality of monochromatic sources, and wherein the control device includes a selecting and switching module for switching the plurality of monochromatic sources in response to an operation of a user, characterized in that the selecting and switching module is configured to select one or more, or all of the plurality of monochromatic sources to form a predetermined combination, and wherein the selecting and switching module is configured to set a sequence for a plurality of the predetermined combinations, and perform a switch or cycle according to the sequence in response to the operation of the user.

2. The illumination module according to claim 1, characterized in that the control device includes a main function part for changing states of the monochromatic sources, and a single operating element which is operatively connected to the main function part and which is accessible to the user.

3. The illumination module according to claim 2, characterized in that the operating element is configured in the form of a button, which, when being pressed, can realize the switch among different monochromatic sources and/or different predetermined combinations of the monochromatic sources.

4. The illumination module according to claim 3, characterized in that the operating element is added with a function of knob on the basis of the button, the button and the knob being integrated on a single operating element, and the knob being arranged to regulate the brightness of the monochromatic source.

5. The illumination module according to claim 4, characterized in that the knob is arranged to be rotated in two different speeds, so as to adjust the brightness value of related monochromatic source with two different speeds.

6. The illumination module according to claim 3, characterized in that the button is arranged to change the state of one or more monochromatic sources each time when it is pressed.

7. The illumination module according to claim 3, characterized in that the button and/or knob is provided with depressions on the end surface to accommodate fingers of the user.

8. The illumination module according to claim 3, characterized in that the button and/or knob is positioned close to an adjustment wheel of the microscopic observation system of the microscope apparatus.

9. The illumination module according to claim 1, characterized in that the control device includes a brightness adjustment module which is configured to modify the brightness value of each individual monochromatic source.

10. The illumination module according to claim 1, characterized in that the control device includes a memory module which is configured to store the brightness value of individual monochromatic source and which can impart the stored brightness value to corresponding monochromatic source.

11. The illumination module according to claim 10, characterized in that the memory module is configured to memorize the brightness value of a monochromatic source just when the latter is turned off, and to impart the stored value to the monochromatic source when the latter is lighted up again.

12. The illumination module according to claim 1, characterized in that the control device includes a comparison module configured to compare the brightness value of the individual monochromatic source with a given threshold, and refuse to turn on the monochromatic source when the brightness value of the monochromatic source memorized by the memory module is lower than the threshold.

13. The illumination module according to claim 1, characterized in that the monochromatic source is in the form of an LED.

14. The illumination module according to claim 13, characterized in that the LED includes four LEDs configured to emit light with different wave lengths.

15. The illumination module according to claim 14, characterized in that in the four LEDs, a first LED is configured to emit a light with a wave length of 470 nm, a second LED is configured to emit a light with a wave length of 365 nm or 380 nm, a third LED is configured to emit a light with a wave length of 625 nm, and a fourth LED is configured to emit a light with a wave length of 505 nm or 565 nm.

16. The illumination module according to claim 1, characterized in that the monochromatic source is in the form of a laser, a xenon lamp with a filter, or a white light source with a filter.

17. The illumination module according to claim 1, characterized in that a plurality of light source indicators are further provided, which are respectively associated with the plurality of monochromatic sources and which are to indicate the state of the corresponding monochromatic sources.

18. The illumination module according to claim 17, characterized in that the plurality of light source indicators are configured to respectively emit a light with a different color.

19. The illumination module according to claim 17, characterized in that the plurality of light source indicators are each configured to illuminate in two different manners, especially an always-on manner and a flashing or blanking manner.

20. A microscope apparatus, comprising an illumination module, wherein the illumination module is the illumination module according to claim 1.

21. The microscope apparatus according to claim 20, characterized in that it is a fluorescence microscopes apparatus.

22. A method for controlling an illumination module of a microscope apparatus, the illumination module including a plurality monochromatic sources and a control device that controls states of the plurality of monochromatic sources, the control device comprises a selecting and switching module, wherein the plurality of monochromatic sources are switched by the selecting and switching module in response to the operation of the user, characterized in that one or more, or all of the plurality of monochromatic sources are selected by means of the selecting and switching module to form predetermined combinations, and wherein the predetermined combinations are set in a sequence and switched or circulated according to the sequence by means of the selecting and switching module in response to the operation of the user.

23. The control method according to claim 22, characterized in that the control device comprises a single operating element in the form of a button, the control method including pressing the button to switch among different monochromatic sources and/or predetermined combinations of the different monochromatic sources.

24. The control method according to claim 23, characterized in that the operating element is added with a function of knob on the basis of the button, the button and the knob being integrated on one and the same operating element, and the knob being rotated to adjust the brightness of each monochromatic sources.

25. The control method according to claim 24, characterized in that the control method includes rotating the knob to adjust the brightness value of individual monochromatic source, in particular the brightness value of the monochromatic source that is currently turned on.

26. The control method according to claim 25, characterized in that the control method includes rotating the knob in a first speed to progressively adjust the brightness value of the related monochromatic source.

27. The control method according to claim 25, characterized in that the control method includes rotating the knob in a second speed to let the brightness value of the related monochromatic source rapidly reach a maximum value or a minimum value.

28. The control method according to claim 22, characterized in that the control method includes storing the brightness value of each individual monochromatic source just when the latter is turned off, and imparting the stored brightness value to corresponding individual monochromatic source when the latter is turned on.

29. The control method according to claim 22, characterized in that the control method includes comparing the brightness value of individual monochromatic source with a given threshold when the individual monochromatic source is to be turned on, and refusing to turn on the monochromatic source when the brightness value is lower than the threshold.

30. The control method according to claim 22, characterized in that the control method includes showing which monochromatic source is currently turned on by means of light source indicators with lights of different colors, and representing the brightness value of the related monochromatic source by means of a light in different states.

31. A microscope apparatus, comprising an illumination module, wherein the illumination module can be used by the control method according to claim 22.

32. The microscope apparatus according to claim 31, characterized in that it is a fluorescence microscopes apparatus.

* * * * *